2 Sheets--Sheet 1.

W. E. DAMANT.

Machine for Cutting Lozenges, &c.

No. 5,099. Reissued Oct. 15, 1872.

Witnesses:

A. Bennemendorf.

Wm H. C. Smith.

Inventor:

W. E. Damant.

per Munn & Co

Attorneys.

2 Sheets--Sheet 2.
W. E. DAMANT.
Machine for Cutting Lozenges, &c.
No. 5,099. Reissued Oct. 15, 1872.
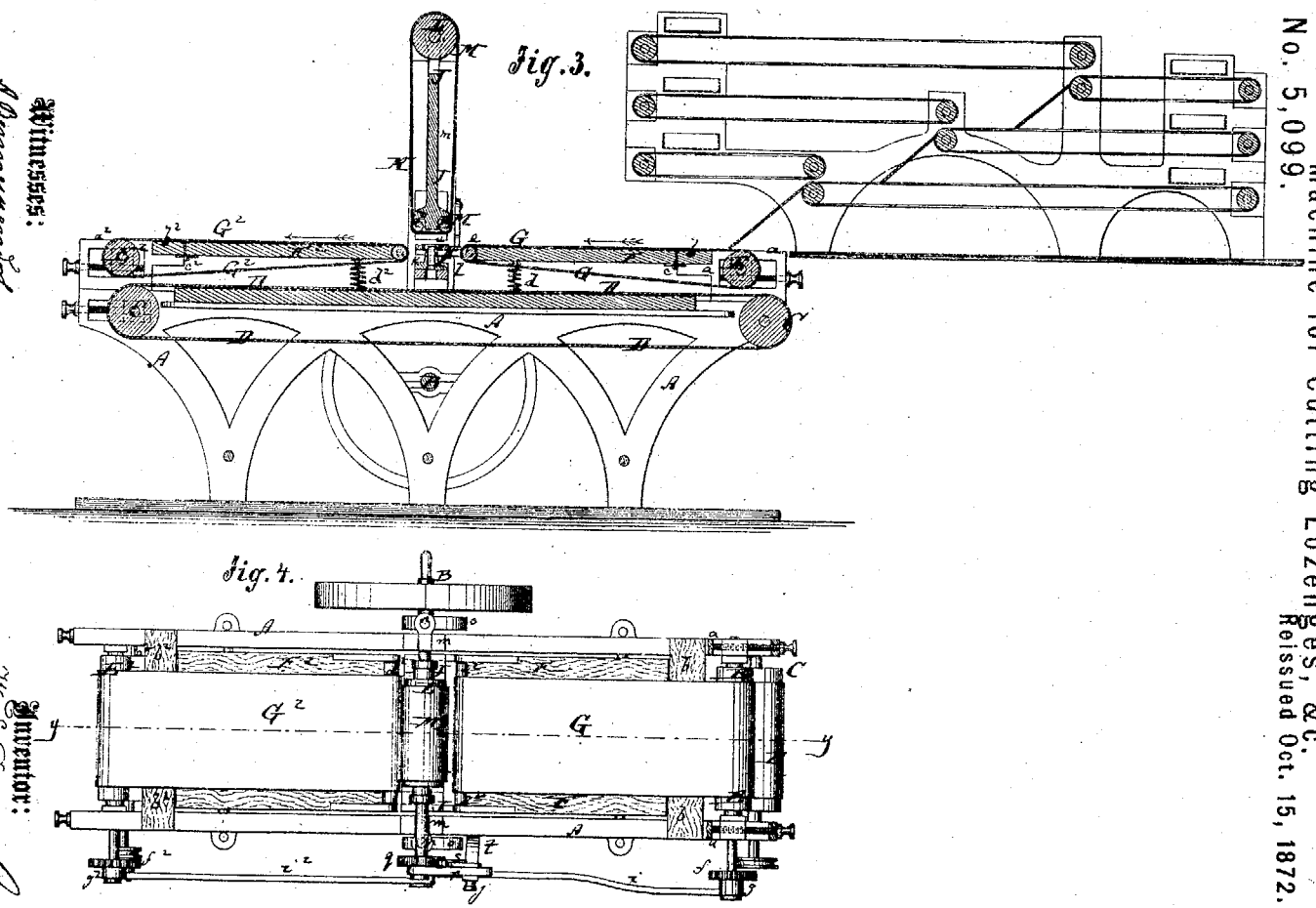
Witnesses:
A Bennekendorf.
Wm. H. C. Smith.
Inventor:
W. E. Damant.
Per Munn & Co
Attorneys.

UNITED STATES PATENT OFFICE.

WILLIAM E. DAMANT, OF WEST HOBOKEN, NEW JERSEY, ASSIGNOR TO HIMSELF AND WILLIAM HESSIN.

IMPROVEMENT IN MACHINES FOR CUTTING LOZENGES, &c.

Specification forming part of Letters Patent No. 113,635, dated April 11, 1871; reissue No. 5,099, dated October 15, 1872.

DIVISION A.

*To all whom it may concern:*

Figure 1:
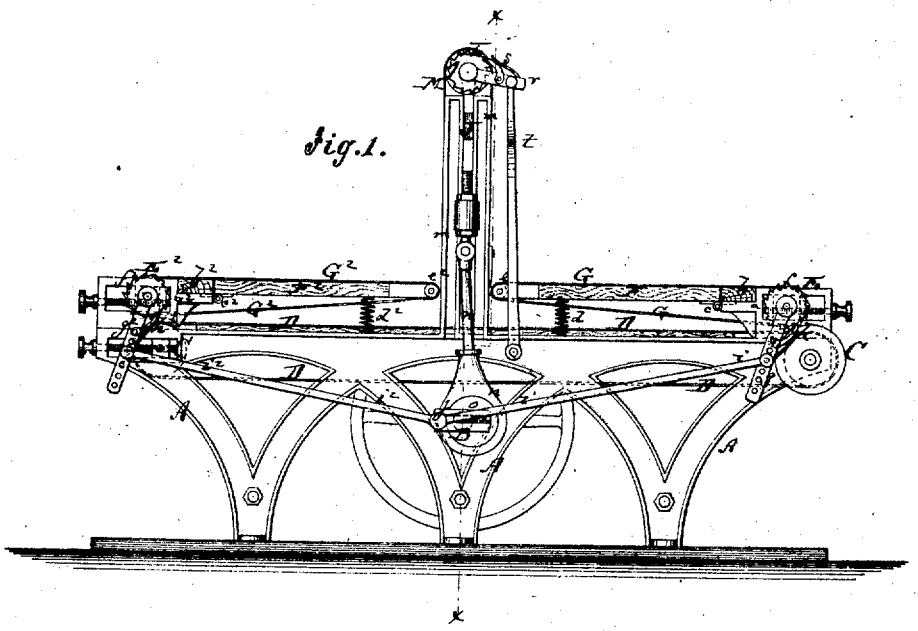
Figure 2:
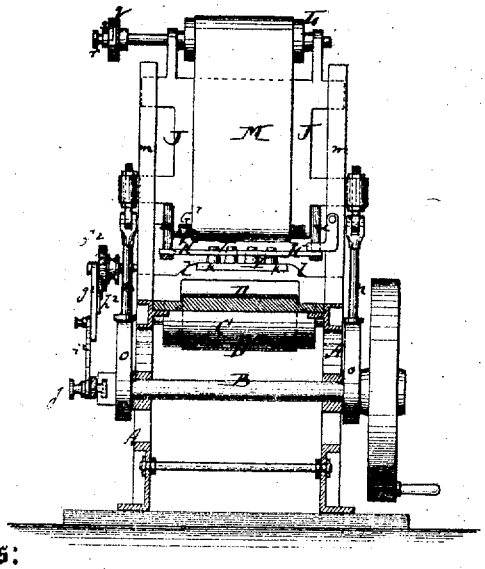

Be it known that WILLIAM EDWARD DAMANT, of West Hoboken, in the county of Hudson, and State of New Jersey, has invented a new and Improved Machine for Cutting Lozenges, of which the following is a specification:

Figure 1 represents a side elevation of my improved machine for cutting lozenges; Fig. 2 is a vertical transverse section of the same taken on the plane of the line *x x*, Fig. 1; Fig. 3 is a vertical longitudinal section of the same taken on the plane of the line *y y*, Fig. 4, and showing also an attachment for rolling the paste; Fig. 4 is a plan or top view of the machine.

Similar letters of reference indicate corresponding parts.

This invention relates to a new machine for cutting the flat pieces of confectionery, known in the trade as "lozenges," and which are usually circular, but often also of other form. The main object of the invention is to so construct the machine that it will operate by continuous action on endless or uninterrupted sheets of paste, and cut the lozenges therefrom with exactness and rapidity. The invention consists mainly in the use of a hinged feed-table, which carries an endless feed-apron and a perforated platform, embracing the stationary annular cutters. The platform is flush with the cutters when the machine is at rest or not cutting, but moved down to carry the paste against the cutting-edges during the desired operation. The invention consists also in the connection, with said table, platform, and fixed cutters, of a vertically-reciprocating frame, which carries an apron against the cutting-edges, to insure the entire piercing of the paste. Between this frame and the movable platform are interposed elastic blocks or pieces, which swing down the said platform during the descent of the frames. The invention also consists in the new arrangement of mechanism for imparting the required motion to the several aprons of the feed-table, reciprocating-frame, and lozenge and waste conveyers, as hereinafter more fully described.

A in the drawing represents the frame of my improved lozenge-cutting machine. It is made of metal or wood, or both, of suitable shape and size, to be best adapted to the several devices and mechanisms attached to it. In about the middle of the frame A, below the top of the same, is hung the transverse driving-shaft B, which receives rotary motion by suitable means. The two ends of the frame A carry transverse drums C C, which are about on a level with each other, and serve to hold an endless apron, D, as shown. Continuous or intermittent rotation is imparted to one of the drums C for moving the apron D in the desired manner. One drum C is hung in bearings which are longitudinally adjustable to permit proper tension to be applied to the apron. Above one drum C is hung, in projecting-ears *a a* of the frame A, a transverse roller, E. The ears *a* are, in front of the roller E, connected by a cross-piece, *b*, to which is hinged at *c* a table, F, extending about to the middle of the frame A. Springs *d d* on the under side of the table F serve to hold the same in a horizontal position, but do not prevent it from being swung down when pressure is applied from above. The free end of the table F carries a transverse roller, *e*. An endless apron, G, is placed around the rollers E *e* and passes around the table F, as shown, its upper part being about flat on said table. When the table is moved on its hinges the apron will be carried up or down with it without having its rotary motion interfered with. The roller E carries at one end a ratchet-wheel, *f*, and a loose arm, *g*, which has a spring-pawl, *h*, for the ratchet-wheel, and is, by a pitman, *i*, connected with a crank-pin, *j*, on the shaft B. By this connection intermittent rotary motion will be imparted to the roller E and apron G. This motion can be regulated by having the crank-pin *j* adjustable on the shaft and the pitman adjustable on the arm *g*, so that the strokes of the arm may be lengthened or shortened at will. The other end of the frame A carries above the other drum C a roller, $E^2$, hung in ears $a^2$, which are connected by a cross-piece, $b^2$, in a manner very similar to that described for the roller E. To the cross-piece $b^2$ is hinged at $c^2$ a table, $F^2$, extending to within a short distance from the end of the table F, and held up by springs $d^2$. A roller, $e^2$, is hung in the free end of the table $F^2$ to receive an apron, $G^2$, that hangs on $E^2$ and $e^2$. The two tables F and $F^2$ are, in their positions of rest, nearly on a level with one another. The roller $E^2$ carries a ratchet-wheel, $f^2$, and loose arm $g^2$, which has a pawl, $h^2$, and is, by a pitman, $i$, connected with the crank-pin $j$. The motion of the aprons G $G^2$ will thus be obtained by a similar means, and should be alike in degree. The rollers E $E^2$ are adjustable in their bearings, to provide for a proper tension of their respective aprons. To the free end of the table F is secured, by means of arms, so as to be clear of the apron G, a perforated platform, H, which reaches nearly to the table $F^2$, filling the gap between F and $F^2$, as shown. I I are the annular cutters. They are in a straight or curved row or rows affixed to a plate, $k$, which is, with its ends, fitted between dovetailed or grooved supports $l$ $l$ that project from the frame A. The plate $k$ can be withdrawn from between the supports $l$ when it is desired to sharpen the cutters. The cutters are placed vertically, so that they project through the apertures of the platform H, the said apertures being of such size and form as to nicely fit the outer sides of the cutters. The upper sharpened edges of the cutters are flush with the surface of the platform H, as long as the table F is held horizontal by the springs $d$; but as the cutters are stationary they will project through the platform whenever the same is moved down with its table. At the sides of the frame A, about in line with the cutter-holder $k$, are arranged vertical posts $m$ $m$, which are slotted to constitute guides for a vertically-reciprocating frame, J. This frame is, by rods $n$ $n$, connected with eccentrics $o$ on the shaft B, to receive the desired up-and-down motion from the same. The upper end of the frame J carries the drum L and its lower end a pair of rollers, $p$. An endless apron, M, passes over the drum L and rollers $p$, its lower part being above the cutters, as shown. The drum L carries a ratchet-wheel, $q$, and loose arm $r$, which has a spring-pawl, $s$, for said ratchet-wheel. The arm $r$ is pivoted to a standard, $t$. The vertical movement of the frame J causes the pawl to turn the apron M at every other stroke. $u$ $u$ are rubber blocks or pieces interposed between the frame J and platform H.

The operation is as follows: The plate to be cut is, from the rolling apparatus, deposited upon the apron G and fed by the same to the platform H. When the paste covers the platform and cutters the frame J moves down and forces, by means of the blocks $u$ $u$, the platform down over the cutters. The apron M holds the paste on the platform and causes it to be pierced by the cutters so that pieces of the desired shape will be within the latter. When the apron M reaches the cutters the paste must have been completely cut through. The frame J is then elevated, the table F following, until the platform is again flush with, or rather slightly above, the cutters. The plate is then moved ahead, the waste arriving on the apron $G^2$, while a new portion is placed over the cutters by the action of the feed. The lozenges cut out fall through the cutters upon the apron D, and are by the same conveyed to a suitable receptacle. The rotation of the apron M is provided to prevent the same from being cut by frequent contact in the same place with the knives.

The cutters are annular, as stated, for circular lozenges, but may be of other form, if desired, having, however, in every case, continuous cutting-edges.

It will be noticed that the swinging of the table F is of great value and importance, as it provides for the cutting of the paste without requiring the cutters to move. This gives a cleaner cut and smoother edge of lozenge than the moving of the cutters toward the paste, and requires less power, besides. The hinging of the table $F^2$ is, however, not so necessary, and may be dispensed with.

Having thus described the invention, we claim as the invention of WILLIAM E. DAMANT and desire to secure by Letters Patent—

1. The hinged feed-table carrying the apron G and platform H, to operate in conjunction with the stationary cutters, substantially as herein shown and described.

2. The reciprocating frame J, combined with the stationary cutters and swinging perforated platform H, substantially as herein shown and described.

3. The elastic blocks $u$ $u$ interposed between the reciprocating frame J and swinging platform H, substantially as herein shown and described.

4. The cutters I I affixed to a sliding plate, K, and applied below the reciprocating frame J, substantially as herein shown and described.

5. The combination of the roller E with the wheel $f$, arm $g$, pawl $h$, pitman $i$, and crank-pin $j$, all arranged to operate substantially as herein shown and described.

WILLIAM EDWARD DAMANT.
WILLIAM HESSIN.

Witnesses for DAMANT:
A. V. BRIESEN,
T. B. MOSHER.

Witnesses for HESSIN:
R. JAMES,
W. H. JEFFREY.